US012607585B2

(12) United States Patent　　　(10) Patent No.: US 12,607,585 B2
Brandelero et al.　　　　　　　　　(45) Date of Patent: Apr. 21, 2026

(54) METHOD FOR MEASURING DEGRADATION OF THERMAL RESISTANCE BETWEEN POWER SEMICONDUCTOR AND HEAT SINK, AND CONTROL DEVICE FOR POWER SEMICONDUCTOR

(71) Applicant: MITSUBISHI ELECTRIC CORPORATION, Tokyo (JP)

(72) Inventors: Julio Brandelero, Rennes Cedex (FR); Pierre-Yves Pichon, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 385 days.

(21) Appl. No.: 18/273,440

(22) PCT Filed: Jul. 15, 2021

(86) PCT No.: PCT/JP2021/027439
§ 371 (c)(1),
(2) Date: Jul. 20, 2023

(87) PCT Pub. No.: WO2022/185563
PCT Pub. Date: Sep. 9, 2022

(65) Prior Publication Data
US 2024/0102953 A1　　Mar. 28, 2024

(30) Foreign Application Priority Data
Mar. 1, 2021　(EP) ..................................... 21305246

(51) Int. Cl.
*G01N 25/18*　　　(2006.01)

(52) U.S. Cl.
CPC .................................... *G01N 25/18* (2013.01)

(58) Field of Classification Search
CPC ........... G01N 25/18; G01K 17/00; G01K 7/01
See application file for complete search history.

(56) References Cited

FOREIGN PATENT DOCUMENTS

| JP | 2002-5989 A | 1/2002 |
| JP | 2017-135868 A | 8/2017 |

OTHER PUBLICATIONS

Japanese Office Action for Japanese Application No. 2023-552404, dated May 28, 2024, with an English translation.

*Primary Examiner* — Lee E Rodak
*Assistant Examiner* — Sangkyung Lee
(74) *Attorney, Agent, or Firm* — Birch, Stewart, Kolasch & Birch, LLP

(57) ABSTRACT

A method for measuring degradation of a thermal resistance between a power semiconductor and a heat sink of a power module assembly where the power semiconductor has an internal gate resistance, including measuring a first initial parameter related to the power semiconductor junction temperature, and heating the internal gate resistance and measuring a second initial parameter, related to the junction temperature after the heating, after discrete time intervals during the lifetime of the power module assembly measuring a first subsequent parameter related to the power semiconductor junction temperature heating the internal gate resistance and measuring a second subsequent parameter, related to the junction temperature after the heating, and calculating a thermal resistance degradation, $\Delta R_{Th}$, with the subsequent parameters related to junction temperature and the initial parameters and raising a fault flag in case $\Delta R_{Th}$ is above a limit value.

17 Claims, 9 Drawing Sheets

METHOD FOR MEASURING DEGRADATION OF THERMAL RESISTANCE BETWEEN POWER SEMICONDUCTOR AND HEAT SINK, AND CONTROL DEVICE FOR POWER SEMICONDUCTOR

TECHNICAL FIELD

The present invention concerns the monitoring of degradation of the thermal resistance between a power semiconductor, such as a power converter switching semiconductor, and its heat sink through measurement of the thermal resistance between such power semiconductor and its heat sink. Such degradation is a critical parameter to be measured during the operation of a power device such as a power converter to increase the robustness of such a device against over-heating and to apply condition monitoring functions on a power module of such a power device.

BACKGROUND ART

Currently available methods to identify thermal resistance changes are mostly based on off-line measurements.

In such measurements, the thermal resistance between a power semiconductor module and its heat sink terminal can be measured using general thermal resistance measurement standards such as the ASTM E1225-13, where a hot source is placed on the first terminal of the thermal resistance and a heat flux probe is placed on the second terminal of the thermal resistance. This technique is sufficient to measure the thermal resistance of heterogeneous structures, however it does not provide information on the details of the internal structure, such as the thermal resistance contribution of the different components of the module. Furthermore, the need of a heat source and a heat flux measurement require additional devices on the power semiconductor module which are not compatible with thermal resistance measurement under operation of such module.

A second technique consists in operating a power semiconductor under a known drain/source or emitter/collector power dissipation loss and in measuring the temperature difference between the power semiconductor and the baseplate of such power semiconductor. The main electrical path of the power semiconductor (drain-source or collector-emitter) is used to generate heat and the dissipated losses on the power semiconductor are related to the electric power supplied by an electrical power source. The electrical power needs to be measured with accurate power measurement instruments and the operating condition should be stable. This imposes constraints on when the measurement can be performed and constraints on the circuits used for the monitoring of the operating conditions and the junction temperature and requires precise power and temperature measurement systems. Furthermore, this method is not transposable for an online monitoring where the power semiconductor module is installed on a power converter or for power semiconductor modules with dies in parallel. The dissipated power can be estimated using the electrical characteristics of the power semiconductor, but this requires a precise calibration of the temperature-dependent electrical characteristic of each power semiconductor in a production line, due to significant chip-to chip variability.

Another technique to measure the thermal resistance between a semiconductor device and its heat sink terminal consists in measuring the transient response of the junction temperature of the power semiconductor. The temperature of the semiconductor is increased to a certain value using the power dissipated in the semi-conductor, then the transient temperature signal is recorded with a fast sampling rate after the device is turned-off. This method enables to identify details of the heterogeneous structure of the power semi-conductor module, however this measurement requires a specific control procedure and measurement timescale which is incompatible with an on-line thermal resistance estimation during module operation. Furthermore, the heat needed to increase the semiconductor temperature requires high currents that are not always available, depending on the application.

Then according to the prior art, in order to measure the thermal resistance degradation in on-line conditions or when the power semiconductor module is already installed on a power converter, additional precise sensors are required to provide precise power and junction temperature measurements and/or previously calibrated thermal sensitive electrical parameters (TSEP) are needed. In addition, with regard to TSEP, calibration is required for every single device, given the spread in the electrical parameters, such as miller plateau or internal gate resistance, between power semiconductor modules due to manufacturing variability.

With respect to measurements in operation, the document U.S. Pat. No. 9,689,754 B2 describes a method for estimating the temperature of a semiconductor chip accommodated in a power semiconductor device in operation, such as an IGBT power module, the method comprising the steps of; while the power semiconductor device is in operation determining a voltage drop over the power semiconductor device for a value of applied load current and; estimating the temperature of the semiconductor chip by evaluating the relationship between the determined voltage drop and the value of applied load current on the basis of a semiconductor chip temperature model.

With respect to measurement of ageing, document WO2017102262A1 provides a method where an excitation signal is used to cause an excitation current to flow through a power semiconductor in order to introduce a power loss in such power semiconductor and reading a temperature signal to determine ageing of the power semiconductor.

In such document the excitation current flows between the collector—emitter junction or the source—drain junction of such power semiconductor.

SUMMARY OF INVENTION

In view of the prior art, the present invention aims to provide an on-line measurement method for the degradation of the thermal resistance between a power semiconductor and its heat sink that allows to measure the evolution of the thermal resistance between a power semiconductor device and the heat sink during operation of such power semiconductor, without prior calibration of the electrical characteristic of the power semiconductor and without the need of additional temperature sensors.

More precisely, the present invention concerns a method for measuring a degradation of a thermal resistance $R_{Th}$ between a power semiconductor in a power module assembly and a heat sink of said power module assembly where said power semiconductor has an internal gate resistance, comprising:

measuring a first initial parameter, K0, related to the power semiconductor junction temperature at a stable operating temperature, heating the internal gate resistance through applying an AC voltage $V_{AC}$ of an AC source with a frequency f1 on the gate/source junction of said power semiconductor, and measuring a second initial parameter, K1, related to the junction temperature after said heating, and saving the first and second initial parameters K0 and K1 in a memory, comprising after at least one discrete time interval d∈{d1, . . . , dn} during the lifetime of the power module assembly:

measuring a first subsequent parameter, $K0_d \in \{K0_{d1}, \ldots, K0_{dn}\}$, related to the power semiconductor junction temperature at a stable operating temperature $T0_d \in \{T0_{d1}, \ldots T0_{dn}\}$, and heating the internal gate resistance through applying the AC voltage VAC with a frequency f1 on the gate/source junction of said power semiconductor, and measuring a second subsequent parameter, $K1_d \in \{K1_{d1}, \ldots, K1_{dn}\}$ related to the junction temperature $T1_d \in \{T1_{d1}, \ldots, T1_{dn}\}$ after said heating, and wherein, said method comprises:

calculating a thermal resistance degradation, $\Delta R_{Th}$ with the subsequent parameters related to junction temperature K0d∈{K0d1, . . . , K0dn}, and $K1_d \in \{K1_{d1}, \ldots, K1_{dn}\}$, and the initial parameters K0 and K1 as read from the memory, where $$\Delta R_{Th} = \frac{R_{Th_d}}{R_{Th}},$$

where $$R_{Th} = \frac{K1_0 - K0_0}{P_R},$$

where $$R_{Th_d} = \frac{K1_d - K0_d}{P_R},$$

where d=d1, . . . , dn, and where $P_R$ is the power dissipated by the internal gate resistance under said AC voltage $V_{AC}$, comparing $\Delta R_{Th}$ with a limit value $\Delta R_{Th}$ max, and raising a fault flag in case $\Delta R_{Th}$ is above said limit value.

The proposed method provides an easy way to survey the health of the power semiconductor with no or limited additional sensors and circuitry in addition to the available sensors and circuitry in the power module. Furthermore, the power dissipated on the power semiconductor by the gate resistance is the same all along the lifetime of the power semi-conductor. Additionally, since the power terminals are not used to generate heat in the semiconductor, the complexity of the heating system is reduced given that only the control pads of the semiconductor device is used to generate heat on the semiconductor device and any additional parasitic elements, such parasitic inductors, wired, that may degrade the switching behaviour of the power semiconductor device, are thus not introduced.

In an embodiment, the time interval d∈{d1, . . . , dn} between measurements of the thermal resistance is chosen such as the first parameter K0d remains within a specified range K0+/−k with respect to K0.

The method may comprise storing a table of initial first parameters $K0_{(T)}$ and second parameters $K1_{(T)}$ in a specified initial part of the power semiconductor life for several stable junction temperatures T1 . . . Tn of such power semiconductor in operation and wherein an initial value $K0_d$ is chosen within a stipulated range of the closest $K0_{(T)}$ for a measurement at the end of an interval d.

This provides reference values for several temperatures of the power semiconductor when in operation. Furthermore, the Rth degradation may be measured at any operating temperature of the power semi-conductor device, enabling a fully in-operation thermal resistance degradation monitoring.

The specified initial part of the power semiconductor life may be taken before the 1000 to 1500 first hours of the semiconductor operation time.

This provides a large reference lifetime.

The table may comprise heating time durations h and the first initial parameters $K0_{(T,h)}$ and second initial parameters $K1_{(T,h)}$ may be measured for several of said heating time durations h in reference with different time constants of layers between said power semiconductor and said heatsink.

This provides reference measurements useful to detect the depth of a degradation between the die and heatsink.

The AC voltage may have a DC component to polarize the gate versus the source of the power semiconductor and has a peak voltage lower or equal to the flat band voltage of the power semiconductor.

This may permit to limit VGE or VGS to a drain/source or collector/emitter non-conducting state and be independent on the load operation conditions of the power semiconductor device and avoid pre-calibration of the method for each operating power semiconductor device operating point.

The frequency f1 may be lower than the inverse of the approximated gate input power semiconductor electrical time constant of the power semiconductor.

In such case an approximated value of F1 may be f1= $(2 \cdot \pi \cdot Cin \cdot R)^{-1}$. The frequency f1 may be chosen as the input resonance frequency of the power semiconductor. In such case, an approximated value of f1 may be f1=$(2 \cdot \pi \cdot Lin \cdot Cin)^{-2}$.

This may permit to compute the thermal resistance degradation independently of the parasitic elements Cin and Lin with a low relative error.

To provide a sufficient signa/noise ratio, the frequency f1 may also be higher than $0,1 \cdot (2 \cdot \pi \cdot Cin \cdot R)^{-1}$.

The parameter KXy related to the power semiconductor junction temperature may be the internal gate resistance RXy of said power semiconductor where X equals 0 or 1 and y is null or d.

This permits the thermal resistance degradation to be determined using only the control terminals of the power semiconductor. Furthermore, as a differential value is used to calculate the thermal resistance degradation and the parameter KXy varies dependently with the junction temperature no preliminary calibration of the TSEP-based method is needed.

The method may comprise injecting a square DC current through the internal gate resistance of said power semiconductor without applying said AC voltage to acquire the information of the internal gate resistances.

This provides a measurement means for the internal gate resistance which does not heat said resistance increasing the measurement precision. Furthermore, the junction temperature measurement is decoupled of the heating means and can be used independently for other proposals such the over temperature protection.

In such case, a first AC voltage Vac1 with a first peak to peak level may be applied to acquire the R0 or R0d value and a second AC voltage $V_{AC}$ with a second peak to peak value higher than the first peak to peak value is applied to heat the gate resistance of said power semiconductor and acquire the R1 or R1d value.

The method may comprise providing a resistance with a value Rmeas in a circuit comprising the gate/emitter or gate/source of the power semiconductor and the AC source, injecting said AC voltage $V_{AC}$ as pulses between 5V to 40V to heat the internal gate resistance, measuring a first voltage Vmeas at said resistance extremities as a first parameter Kv0 in a first peak level of the AC source and calculating a R0 value as $$R0 = Rmeas \cdot \left( \frac{V_{AC}}{Kv0} - 1 \right),$$

measuring a second voltage Vmeas at said resistance extremities as a second parameter Kv1 in a last peak level of the AC source and calculating a R1 value as $$R1 = Rmeas \cdot \left( \frac{V_{AC}}{Kv1} - 1 \right),$$

repeating said measuring and calculating to obtain R0d and R1d values.

Said parameter KXy related to the power semiconductor junction temperature may be the junction temperature TXy of said power semiconductor where X equals 0 or 1 an y is null or d.

The voltage $V_{AC}$ may be issued from a control signal of the power component modulated with a heating signal.

This provides a means for calculating the thermal resistance degradation without changing the classical structure of gate drivers.

The invention concerns also a control device for a power semiconductor, comprising means for generating and injecting an AC voltage $V_{AC}$ with a frequency f1 higher than a frequency enabling commutation of said power semiconductor on the gate/source junction or gate/emitter junction of said power semiconductor, means for measuring a temperature or a thermal sensitive parameter of said semiconductor at selected instants of the lifetime of the power semiconductor and computer means for calculating a resulting thermal resistance variation $\Delta R_{Th}$ along the life of said semiconductor through the method of the invention.

In an advantageous realization mode, said thermal sensitive parameter being an internal gate resistance of said power semiconductor, said control device comprises voltage sensing means in the source branch of said AC voltage $V_{AC}$ injecting circuit.

A detailed description of exemplary embodiments of the invention will be discussed hereunder in reference to the attached drawings.

DESCRIPTION OF EMBODIMENTS

Figure 1:
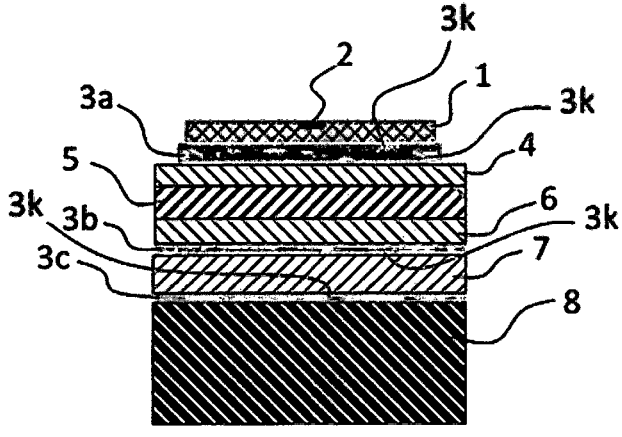
FIG. 1 is an example of power module assembly with degraded thermal resistance.

The present invention concerns methods and devices for monitoring thermal resistance between a power semiconductor and its heatsink in a power semiconductor assembly or power module assembly in order to detect degradation of such thermal resistance. FIG. 1 provides a schematic view of a power semiconductor 1 such as a MOS type transistor, an IGBT, a MOSFET or other. The power semiconductor assembly is composed by a stacking of the power semiconductor 1 and at least two of these elements: a die attach layer 3a, a substrate composed by a metallic structure 4, an electric insulation structure 5 and another metallic structure 6, a substrate attach layer 3b, a base plate 7, a thermal interface 3c and a heat sink 8.

Degradation of the thermal resistance of such stacking may be caused primarily by cracks 3k in the die attach layer 3a, the attach layer 3b or the thermal interface 3c which limit heat flow between the power semiconductor and the heatsink 8.

In the present disclosure, a first embodiment of the method uses a direct temperature measurement at a first terminal of the thermal resistance at the power semiconductor junction with the first die attach layer 3a. The principle of this embodiment is depicted in FIG. 2A and uses an alternating voltage source $V_{AC}$ 11 connected to the gate terminal G and the source or emitter terminal S/E and a temperature sensor 12 connected to a computerized calculation means 13 in order to provide measurements of the temperature before applying the voltage $V_{AC}$ and measurements after applying such voltage and calculating the differential temperature T1-T0 during the lifetime pf the power module to calculate the thermal resistance degradation $\Delta R_{Th}$.

The AC source is a low voltage or low current AC source, i.e. a sinusoidal or square waveform characterized by a peak to peak voltage amplitude, $V_{AC}$, between 5V to 40V, or a peak-to-peak current amplitude IAC, between 2A to 10A, and a frequency comprised between 400 kHz and 8 MHz which is sufficient to inject current in the gate/source or gate/emitter junction without triggering or modifying the source/drain or emitter/collector junction conduction. The AC source may have a DC voltage component. The AC source may be fabricated with a square waveform generated by a PWM signal. The classical gate driving circuit may be used to generate the AC source. The classical gate driving includes a DC power supply and a push-pull amplifier which amplifies the PWM signal.

A second embodiment of the method which uses an indirect temperature measurement based on a measurement of a Thermal Sensitive Electrical. Parameter (hereafter TSEP) is shown in FIG. 2B. In this embodiment the AC source 11 is also connected to the gate and source or emitter but a measurement module 14 which will be discussed later is used to measure a thermal sensitive electrical parameter in connection with a computerized module 15 to provide measurement of the degradation $\Delta R_{Th}$.

Figure 2A:
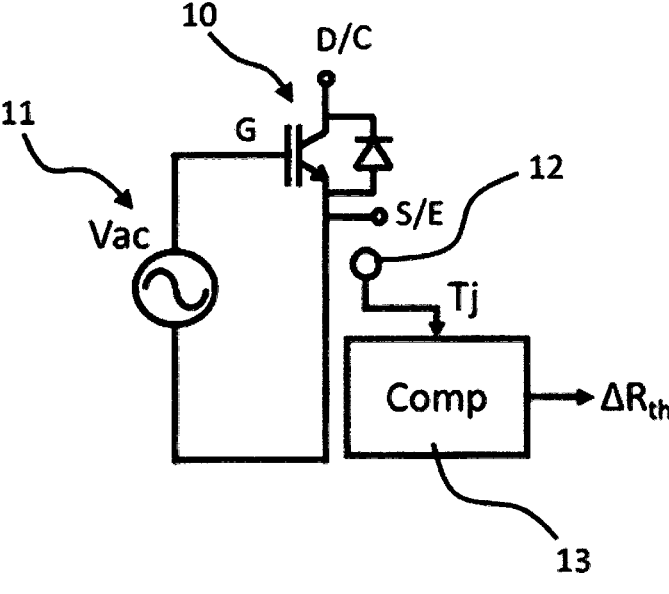
FIG. 2A is a schematic representation of thermal measurement means.
Figure 2B:
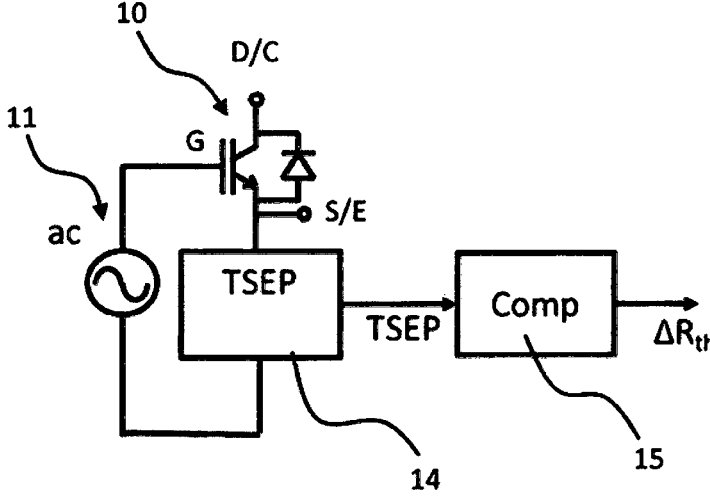
FIG. 2B is a schematic representation of thermal measurement means.

The implanted temperature sensor 12 or the TSEP method block 14 of FIGS. 2A, 2B acquires the parameter K related to the power semiconductor junction temperature, such parameter being directly the temperature T or a thermal sensitive electrical parameter in order to calculate the thermal resistance.

Considering junction temperatures T1 and T0, the initial thermal resistance can be calculated by the following expression, where $P_R$ is the power dissipated by the internal gate resistance under AC excitation.

$$R_{Th} = \frac{T1 - T0}{P_R}$$

Measurements are done during life of the power semiconductor at defined intervals d and the thermal resistance degradation can be defined as the following expression.

$$\Delta R_{Th_d} = \frac{T1d - T0d}{T1 - T0}$$

Hence keeping $P_R$ constant throughout the measurements, we have the following expression.

$$\Delta R_{Th_d} = \frac{T1d - T0d}{T1 - T0}$$

Figure 6A:
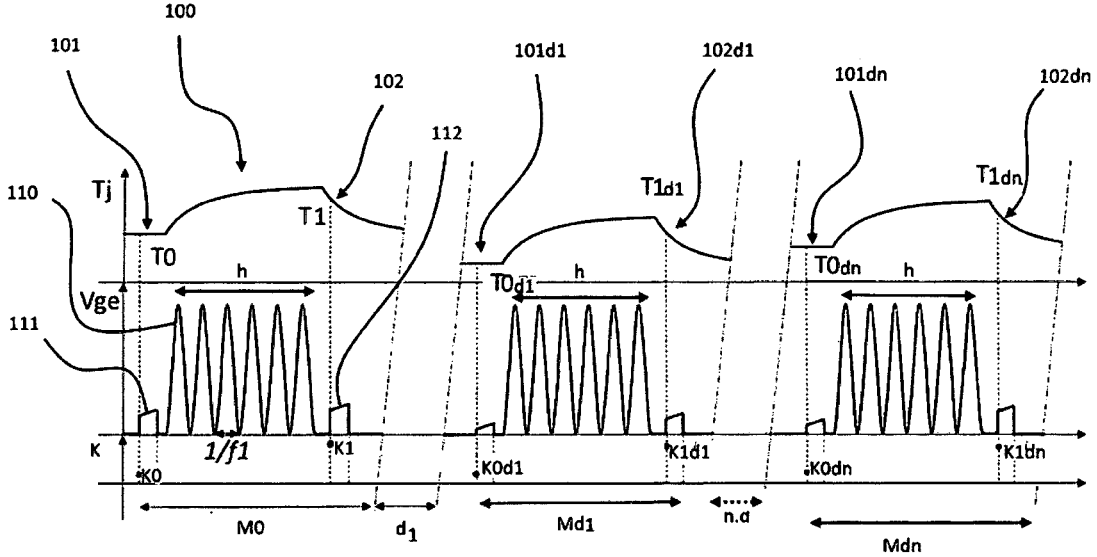
FIG. 6A shows an example of waveforms used in the described processes.
Figure 6B:
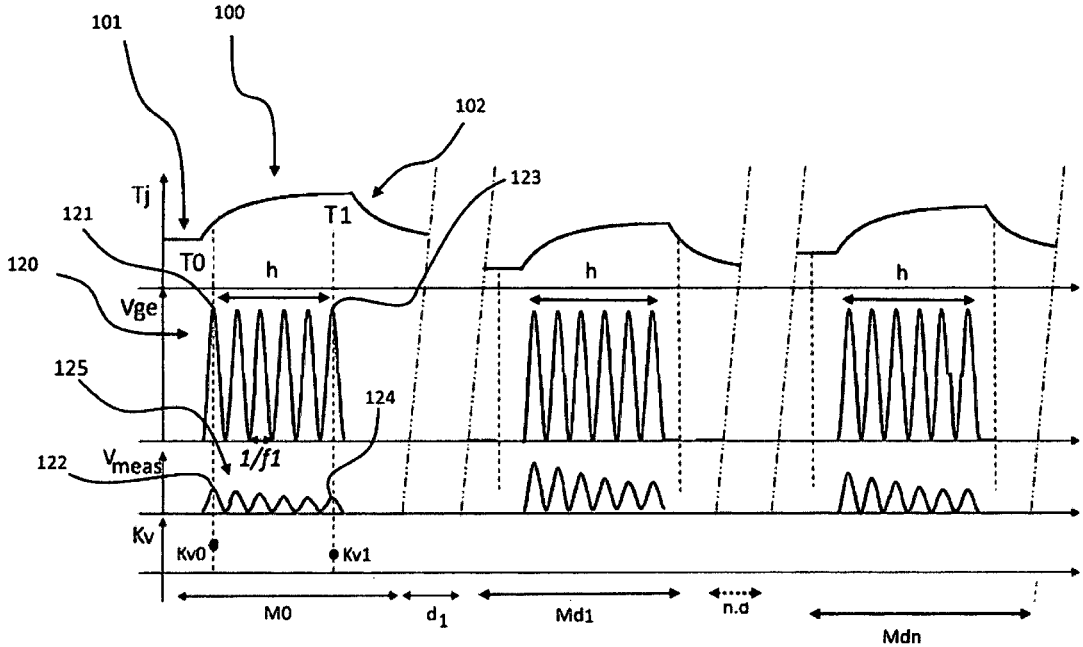
FIG. 6B shows an example of waveforms used in the described processes.

FIGS. 6A and 6B show a temperature waveform 100 of the junction temperature Tj with respect to time, a waveform 110, 120 of an AC source used to heat the internal gate resistance by applying the AC voltage $V_{AC}$ described above the gate/emitter junction.

With respect to temperature, direct measurements of Tj are done prior to applying the waveform signal 110 or 120 to acquire the initial temperature T0 and after or during the application of such waveform signal to acquire the temperature T1 in a first measurement M0 and in subsequent measurements M1, . . . Mn during the lifetime of the power semiconductor.

With the TSEP method, the principle of applying an AC voltage is the same but the measurements rely on measurements of the amplitude of a thermal sensitive parameter K in response to the temperature Tj.

In a first measurement M0, a first parameter K0 related to the temperature is acquired before the AC source is activated or in the first period of the AC source when the junction temperature is in a plateau state 101 (thermal steady state) and, after activation of the AC source a second parameter K1 is acquired. Before activation of the AC source, either no power is dissipated in the power semiconductor or a constant power is dissipated in the power semiconductor by passing current between the emitter and collector.

Figures 7A, 7B, 7C:
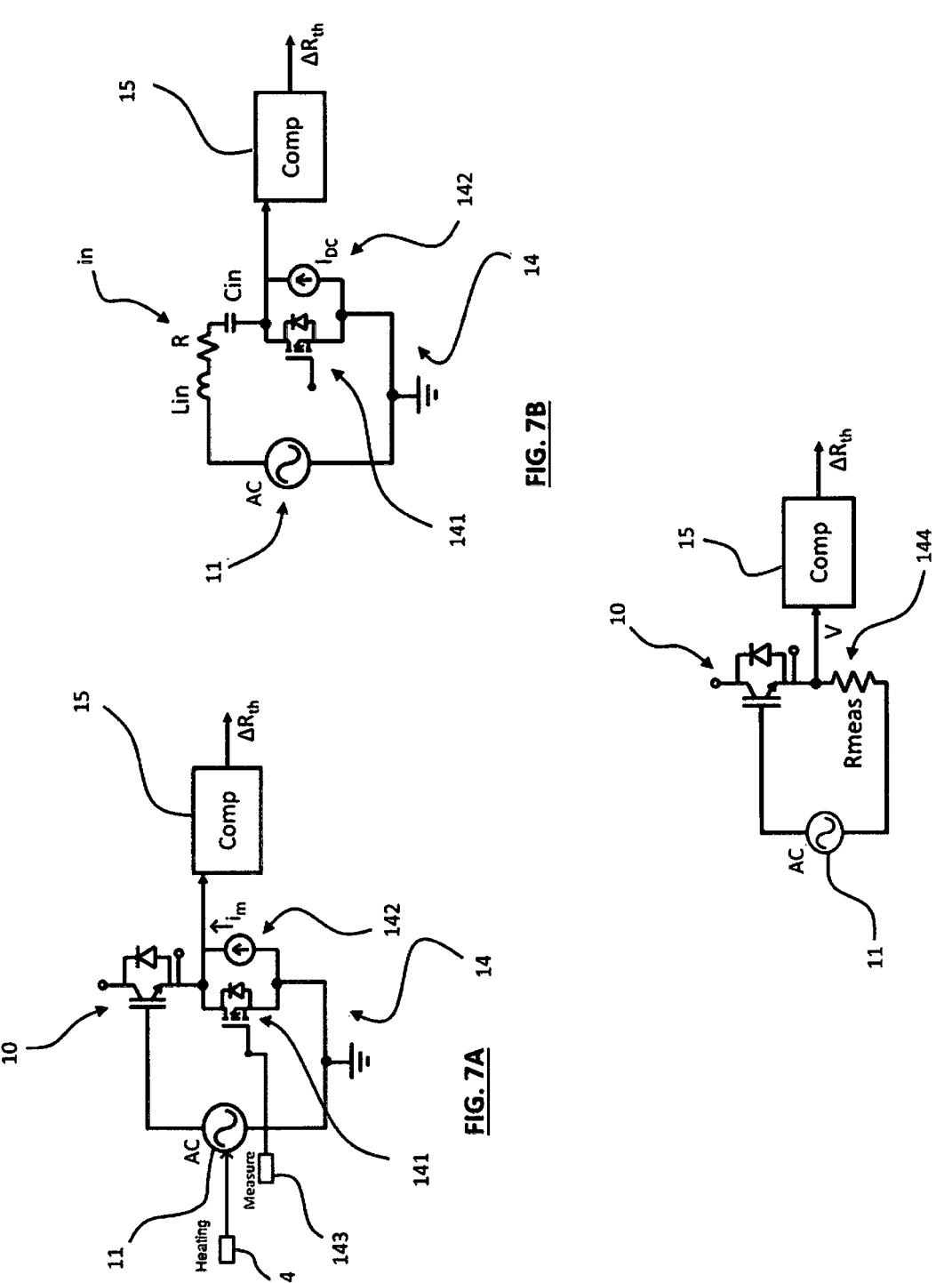
FIG. 7A is a simplified schematic of TSEP measurement embodiment.
FIG. 7B is a simplified schematic of TSEP measurement embodiment.
FIG. 7C is a simplified schematic of TSEP measurement embodiment.

In the TSEP method, depicted in FIG. 6A a reduced amplitude voltage pulse 111 generated by a current step by the means of the dc current source 142 and the switch 141 of FIG. 7A may be generated to acquire the first K0. K0 is taken as the TSEP voltage corresponding to the initial instants of the pulse.

Then, the AC voltage $V_{AC}$ 110 is applied and the dissipated power starts heating the internal gate resistance of the power semiconductor and the gate temperature 100 increases to a certain level 102. After a certain time duration h, the parameter K1 related to the power semiconductor temperature T1 may be acquired in the same way as K0 with a pulse 112 to obtain the electrical parameter.

This time duration, h is chosen between 100 μs to 2 seconds, thus the degradation of a specific layer of the heterogeneous structure can be identified. Importantly, the power semiconductor either does not dissipate any other power losses than the losses generated by the internal gate resistance or dissipates a constant power loss between emitter or source and collector or drain during this first measurement phase.

Both in temperature measurement or TSEP method, the measurement can be repeated several times during an initial life period of the power semiconductor to obtain several values of T0 and T1 or K0 and K1 at several working states of the power semiconductor and for the time duration h. After a time interval d1 which can be for example 100 hours or 2000 hours depending of the application the measurement is repeated in measurement phase Md1 to obtain T0d1 and T1d1, with a direct temperature measurement, or K0d1 and K1d1 with a TSEP measurement. The junction temperature may be in a different plateau state than for the initial measurement. The measure is repeated along the life of the power semiconductor. The thermal degradation measurement which is differential is not dependent on the external factors such as the ambient temperature or the semiconductor power losses level. A first value of the overall thermal resistance, or the thermal resistance of one of the substructures between the die of the power semiconductor and the heatsink, such as, for example, the solder layer, can be outputted at the end of this phase. This phase is repeated according to the application needs in order to refresh the thermal resistance degradation measurement.

The hereunder description concerns the use of the internal gate resistance as the thermal sensitive electrical parameter TSEP. The internal gate resistance is the resistance with the first terminal connected to the gate pad of the power semiconductor and the second terminal connected to gate electrode of a MOS semiconductor type die such the internal gate resistance of an IGBT or a MOSFET.

The internal gate resistance is a parameter independent on the operation point (Voltage, Intensity, frequency) of the power device and uniquely dependent of the temperature. Additionally, the internal gate resistance may be conveniently located at the surface of the power semiconductor device or at the surface of the power module assembly, thus an amount of heat with controlled magnitude can be generated through power dissipated in the internal gate resistance. The heat that flows through the first terminal of the thermal resistance can be generated at discrete time intervals to provide a variation of such resistance depending on the rise of temperature of such internal gate resistance when power is dissipated. An important point is that the internal gate resistance does not suffer degradation during the lifetime of the power module, hence a controlled power dissipation and heat flow through the thermal resistance can be achieved by applying the same AC voltage or current from the beginning of the semiconductor module product life to the end-of-life of the semiconductor module to provide a measurement of the resulting increase of temperature through a measurement of the resistance value.

Hence advantageously no additional power or heat flux measurement probes are necessary since the power dissipated by the internal gate resistance remains the same all along the lifetime of the power module assembly. As discussed above, to provide the measurements, the heat can be generated simply by using the available control terminals of the power semiconductor, such as, for example, the gate and the source/emitter terminals of a power semiconductor transistor, thus the measurement system does not require manipulation of a high voltage or high current junctions (collector/emitter or drain/source junction). Finally, the $R_{Th}$ degradation may be measured for any temperature operation of the power semi-conductor, enabling on-line thermal resistance degradation monitoring.

Back to FIG. 6A, the TSEP-based method may then be a combination of the pulsed current 110 through the gate of the semiconductor and a voltage measurement circuit to measure the voltage evolution that depends on the internal gate resistance and thus depends on the junction temperature. In FIG. 6A, the voltage measurements are done with the trapezoid pulses 111, 112 before and after application of the AC voltage 110. This embodiment may use a current generator as disclosed in FIG. 7A to generate the trapezoid pulses 111, 112. The trapezoid pulsed are the consequence of the square current generator that injects a current step signal through the equivalent circuit of FIG. 7B.

In an alternate embodiment according to FIGS. 6B and 7C, the TSEP method can consist in having the AC voltage source in series with a measurement resistor and acquisition of the voltage across the measurement resistor, such voltage being dependent on the internal gate resistance and thus dependent on the junction temperature. The measurements may then be done at the first peak level 121 and at the last peak level 123 of the signal 120. This implementation reduces the number of required extra devices for the $R_{Th}$ degradation measurement.

As it will be shown, with TSEP having a linear relation with the junction temperature, such as is typically the case for the internal gate resistance, no preliminary calibration for precise junction temperature is necessary to measure the thermal resistance degradation. Using this method eliminates the need of junction temperature sensors.

In the TSEP method, the internal gate resistance is the temperature sensitive electrical parameter and also the heat source. The internal gate resistance dependence with the junction temperature Tj can be written as the following expression.

$$R_x = \delta R_g \cdot Tj_x + R_{g0}$$

Where $\delta R_g$ is the linear resistance variation with the temperature, typically 0.5 mΩ/° C. to 50 mΩ/° C. $R_{g0}$ is the internal gate resistance at 0° C., e.g. between 0.5Ω to 50Ω. In claim 2 the parameter related to the power semiconductor junction temperature Tx (x=0, 1, 0d, 1d) is taken as Rx. Hence $Tj_x$ is proportional to Rx that is also proportional to Kx or Kvx, as measured by the TSEP-based method.

To further give an example, the AC source is taken as a voltage source with an RMS value of $V_{AC}$. The power dissipated on the internal gate resistance, $P_R$, is represented by the following equation.

$$P_R = \frac{Cin^2 R_x V^2 \omega^2}{Cin^2 Lin^2 \omega^4 + Cin^2 R_x^2 \omega^2 - 2 CinLin\omega^2 + 1}$$

where $\omega = 2 \cdot \pi \cdot f1$.

As an example, taking $R_{Th} = (Tj_1 - Tj_0)/P_R$, and Rx proportional to Kx or Kvx. Hence $R_{Th}$ can be calculated as the following equation.

$$R_{Th} = \frac{(R_1 - R_0)\left(Cin^2 Lin^2 \omega^4 + Cin^2 R_1^2 \omega^2 - 2 CinLin\omega^2 + 1\right)}{\delta R_g Cin^2 R_1 V^2 \omega^2}$$

Because of a degradation of one or several substructures constituting the thermal resistance, the thermal resistance changes from the value $R_{Th}$ to the value $R_{Thd}$. The thermal resistance degradation defined previously as $$\Delta R_{Th} = \frac{R_{Th_d}}{R_{Th}},$$

can thus be expressed as the following equation.

$$\Delta R_{Th} = \frac{R_1(R_{0d} - R_{1d})\left(Cin^2 Lin^2 \omega^4 + Cin^2 R_{1d}^2 \omega^2 - 2 CinLin\omega^2 + 1\right)}{R_{1d}(R_0 - R_1)\left(Cin^2 Lin^2 \omega^4 + Cin^2 R_1^2 \omega^2 - 2 CinLin\omega^2 + 1\right)}$$

The value of the elements Lin, and Cin can be measured for each type of power semiconductor. They are typically described in datasheets of power semiconductor power modules. Note that this equation does not include the calibration parameters δR. This demonstrates that a TSEP calibration procedure is not required to measure a change in the thermal resistance.

Figure 3:
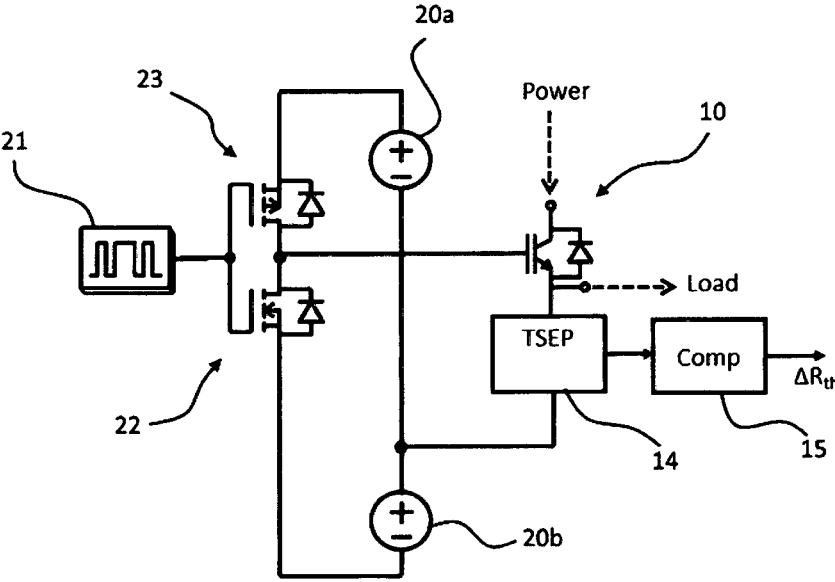
FIG. 3 is a simplified schematic representation of a TSEP measurement circuit.

With respect to the generation of the AC source, FIG. 3 shows a possible implementation where the AC source is done with a square waveform generated by a PWM signal 21, a bipolar DC power supply composed by two voltages source 20a and 20b and a push-pull amplifier 22, 23 which amplifies the PWM signal. In this implementation the DC power supply 20a, 20b may be referenced in order to keep the gate/source or gate/emitter voltage under 1V to avoid conduction of the drain/source or emitter/collector junction when the measurement is done off line or during non-conducting states of the power semiconductor.

Figure 4:
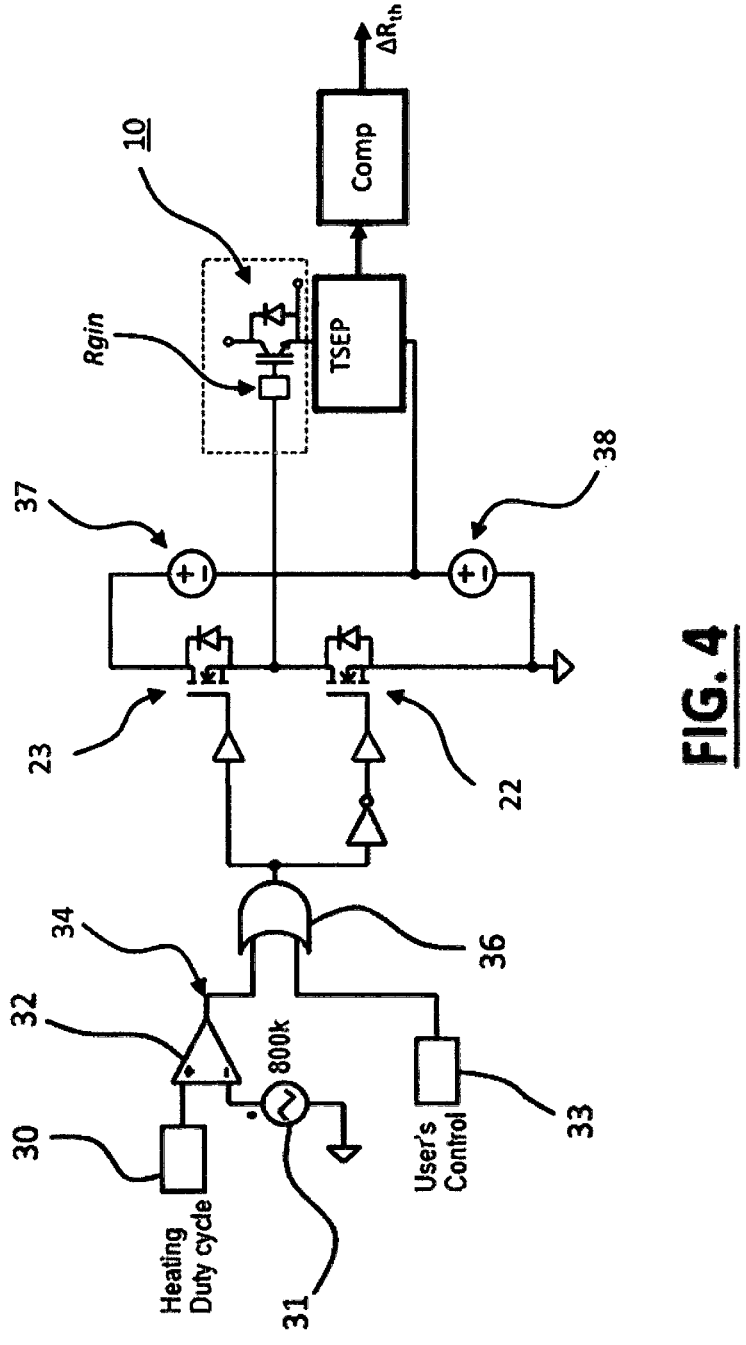
FIG. 4 is a simplified schematic representation of combined gate driver and thermal resistance measurement circuit.

With respect to the generation of the AC source, FIG. 4 shows a possible implementation where the AC source is done with the classical gate driving circuit with positive 37 and negative 38 polarization of gate drivers switches 22, 23. The heating PWM generator with a triangular signal generator 31 having a high frequency f1 is compared with the Heating duty cycle 30, normally comprised between 0.05 and 0.2, through a comparator 32, the comparator output generates an AC signal 34 as a heating command that is combined through a OR gate 36 with the user's control signal 33.

Figure 5B:
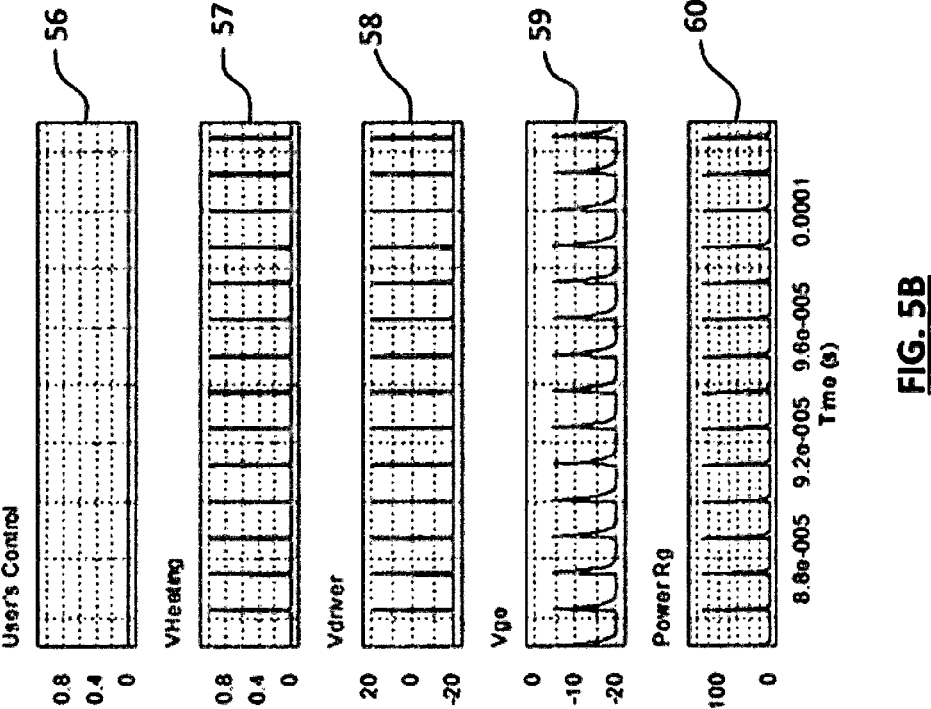
FIG. 5B shows waveforms of signals in the FIG. 4 embodiment.
Figure 5A:
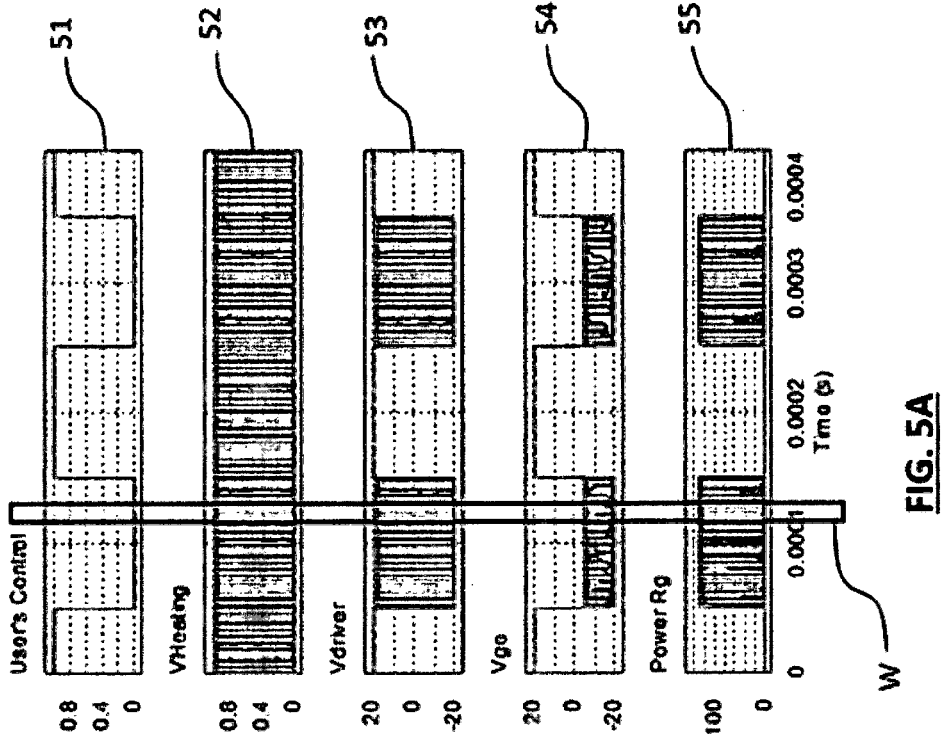
FIG. 5A shows waveforms of signals in the FIG. 4 embodiment.

The signals obtained are represented in FIGS. 5A and 5B. In FIG. 5A are shown the waveform 51 of the user's control signal 33 the waveform 52 of the output of the comparator 32, Vheating signal, 32, the waveform 53 of the driver output signal at the gate to source/emitter semiconductor terminal, the waveform 54 of the gate to source/emitter voltage Vgs or Vge and the waveform 55 of the Power Rg, the power dissipated in the internal gate resistance.

FIG. 5B shows the same signals in the zoomed W window of FIG. 5A and shows that during low logic of Vcontrol 56, the Vheating pulses 57 provides Vdriver pulses 58 which cause the Vgs or Vge pulses 59 to be sufficiently narrow, controlled by the Heating duty cycle 30, to avoid conduction of the Drain/Source or emitter/collector junction thereby enabling only power dissipation in the internal gate resistance of the power semiconductor. Furthermore, the off-state of the power semiconductor as requested by the user's control signal 33 is respected. Advantageous, the heating phase is transparent for the user.

Figure 5C:
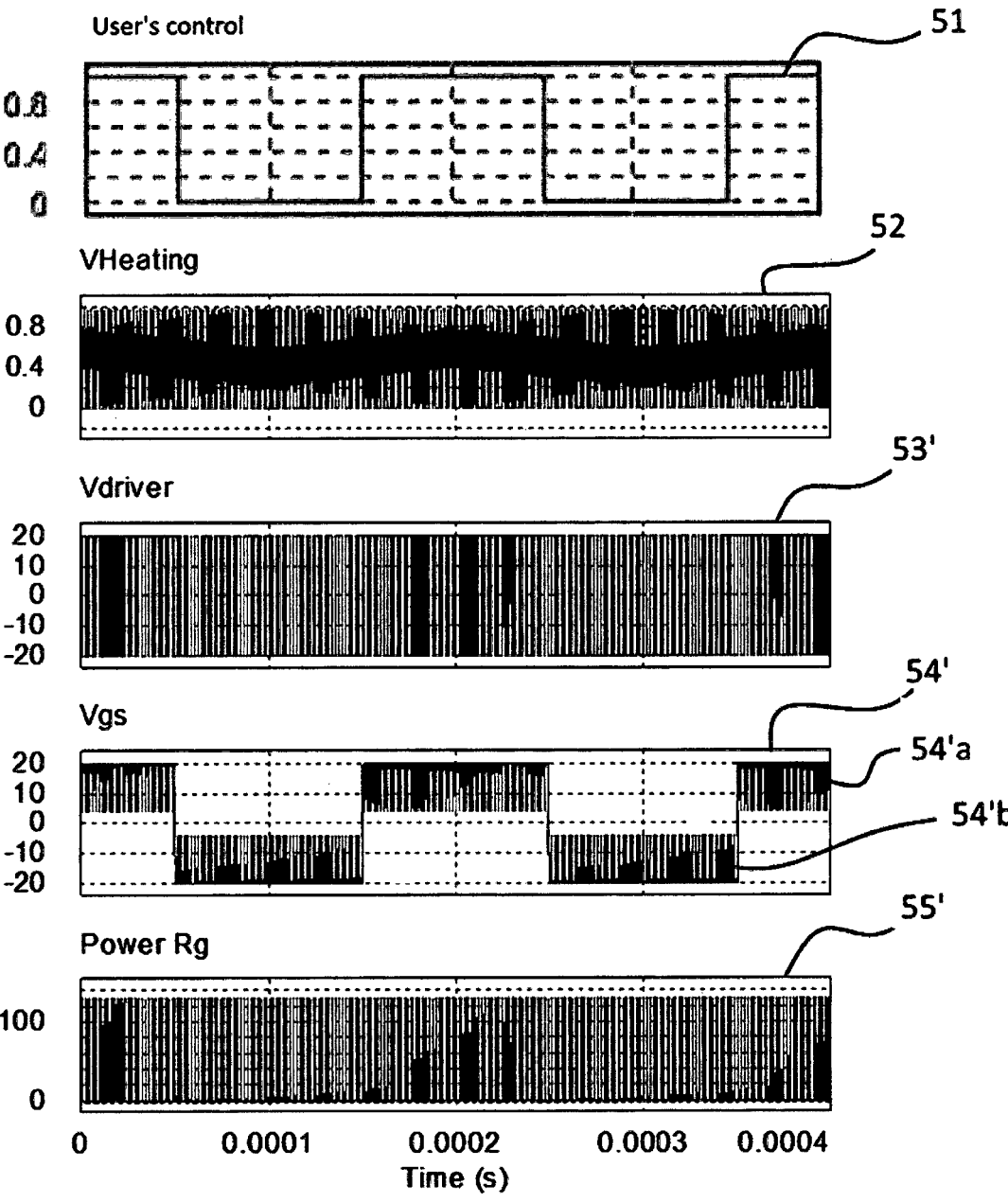
FIG. 5C shows waveforms of an alternate embodiment.

A design where the OR gate is replaced by an XOR gate is also possible and, in such case, as depicted in FIG. 5C, the same user's control 51 is superimposed with the Vheating signals 52 to provide the Vdriver signal 53' and high frequency pulse trains at f1 are present at the, positive and negative values of Vgs 54', thus providing Drain Source conduction phases in the upper part 54'a of the pulse trains and no Drain/Source conduction on the lower pulse trains 54'b. In the waveform 55', the power dissipated in the gate resistance is dissipated along the complete segment but remains independent from the power dissipated in the drain/source junction. Furthermore, the state of the semiconductor as requested by the user's control signal 33 is respected in on-state and off-state. Adjustments can be done on the Heating duty cycle 30 during the on-state and off-state in order to keep the Vgs voltage in the respective level. Advantageous, the heating phase is transparent for the user.

The implanted temperature sensor or the TSEP method block acquires the parameter related to the power semiconductor junction temperature.

With respect to the voltage measurement circuit to measure the voltage evolution that depends on the internal gate resistance and thus depends on the junction temperature in the TSEP-based method, examples of measurements circuits are given in FIGS. 7A and 7C, while FIG. 7B is the equivalent gate input circuit for the circuit of FIG. 7A.

In FIG. 7A a dc current source 142 is connected in parallel with a switch 141. While the AC source 11 is deactivated through the heating command 30, the switch 141 is open through a measure command 143 to inject the current with a peak-to-peak current amplitude $I_m$ in the form of a step current waveform in the gate/source pads of the power semiconductor and then through to the internal gate resistance. Since the AC source is deactivated, the voltage measured across the current source, K0 and K1 is the internal gate resistance times the injected current peak-to-peak amplitude $I_m$.

The equivalent input circuit of the MOS gate input impedance is shown in FIG. 7B with Lin the parasitic inductance, R the internal gate resistance and Cin the parasitic input capacitance of the MOS.

In FIG. 7C, a resistor 144 with a value Rmeas is connected in between the source/emitter of the power transistor and the AC source 11. A high level, $V_{AC}$ between 5V to 40V as pulses 120 in FIG. 6B on the gate emitter junction, is used to heat the internal gate resistance. Such pulses provide a measured voltage Kv0 and Kv1 sampled from Vmeas 122. During pulse 120 of FIG. 6B, the first peak level 121 of the AC source, $V_{AC}$, is first used to capture the Kv0 value and the related gate resistance that is calculated as $$R0 = Rmeas \cdot \left( \frac{V_{AC}}{Kv0} - 1 \right)$$

with Kv0 taking the value Vmeas 122. Then, the last peak level 123 is used to capture the Kv1 value and the related gate resistance that is calculated as $$R1 = Rmeas \cdot \left( \frac{V_{AC}}{Kv1} - 1 \right)$$

with Kv1 taking the value Vmeas 124. The same procedure is used in subsequent measurements to determine $\Delta R_{Th}$ as described in the previous formulas. In this example the intermediate parameters Kv0 and Kv1 permit to obtain the resistance R0, R1 which is the thermal sensitive parameter. This implementation reduces the number of required extra devices for the $R_{Th}$ degradation measurement.

With respect to the frequency of the AC source and the equivalent gate input circuit of FIG. 7B, several embodiments may provide advantages:

By choosing a frequency such as $f1 < 0.33 \cdot (2 \cdot \pi \cdot Cin \cdot R)^{-1}$, the thermal resistance degradation can be written as the following expression.

$$\Delta R_{Th} = \frac{R_1(R_{0d} - R_{1d})}{R_{1d}(R_0 - R_1)}$$

This expression can be used to calculate the thermal resistance degradation with an estimated error lower than 5% relative (using typical values such as $\delta R/R0 < 1000$ ppm/° C.), in the whole temperature range of a power semiconductor.

As is shown in this expression, only the absolute value of the internal gate resistance needs to be measured to determine the thermal resistance degradation. Thus, there is no need to measure or estimate the junction temperature and a TSEP calibration procedure is not required.

In another embodiment, the frequency f1 is chosen as the input resonance frequency of the power semiconductor, $f1 = (2 \cdot \pi \cdot Lin \cdot Cin)^{-2}$.

Thus, the measurements are not negatively influenced by the parasitic impedance related to the voltage source such the parasitic connection inductances and the sensitivity of the parameter related to the temperature is increased at the maximum.

The thermal resistance degradation can then be estimated by the following equation.

$$R_{Th} = \frac{R_1(R_{0d} - R_{1d})\left(Cin^2 Lin^2 w^4 + Cin^2 R1d^2 w^2 - 2CinLinw^2 + 1\right)}{R_{1d}(R_0 - R_1)\left(Cin^2 Lin^2 w^4 + Cin^2 R_1^2 w^2 - 2CinLinw^2 + 1\right)}$$

For a frequency equals to $(2*\pi*Lin*Cin)^{-2}$, the thermal resistance degradation can be described by the following expression.

$$\Delta R_{Th} = \frac{R_{1d}(R_{0d} - R_{1d})}{R_1(R_0 - R_1)}$$

In another embodiment, since when the frequency decreases less power is dissipated in the internal gate resistance, resulting in a lower temperature increase for a given $V_{AC}$, and ultimately a lower signal/noise ratio for the $R_{Th}$ degradation measurement. To remain at a sufficient signal/noise ratio, the value f1 may be chosen such as the ratio signal/noise for the internal gate resistance is higher than a specified detection limit. In example f1 may be such as $f1 > M \cdot (2 \cdot \pi \cdot Cin \cdot R)^{-1}$, where M is 0.1.

The thermal resistance degradation calculation may be done in a module 13, 15 having a CPU or a specific FPGA with memory including program memory, calculation memory and storage memory and communication means and having a sufficient processing power to acquire the parameter related to the power semiconductor junction temperature, such as the Tj sensor value or the TSEP value, to calculate a difference, to compare the measurements and to output the thermal resistance variation.

Figure 8:
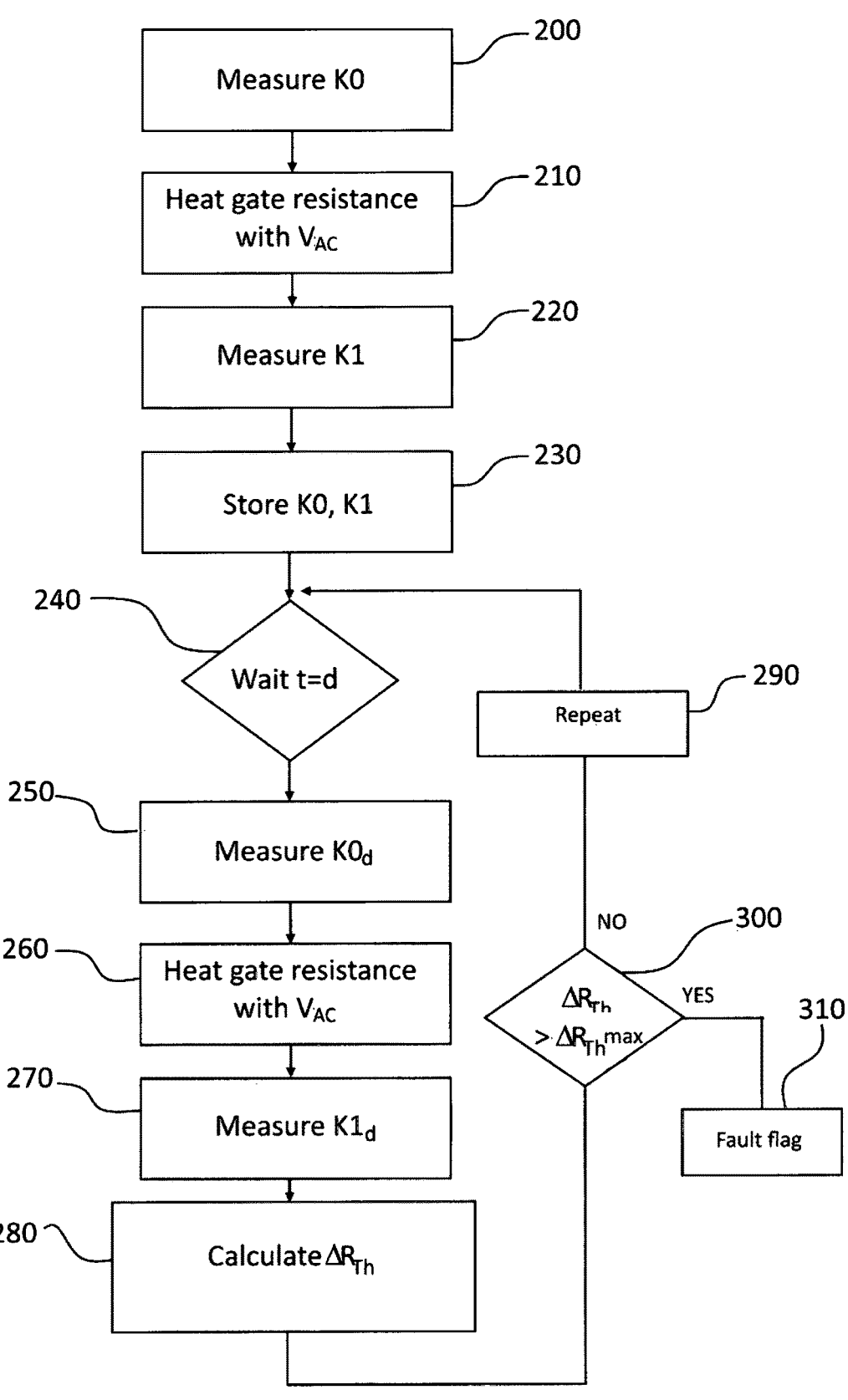
FIG. 8 is a flowchart of an embodiment of a method disclosed.

FIG. 8 shows the principle of a method for measuring a degradation of a thermal resistance $R_{Th}$ between a power semiconductor in a power module assembly and a heat sink of said power module assembly where said power semiconductor has an internal gate resistance.

The method comprises in an initial part of the power semiconductor life:

measuring 200 a first initial parameter, K0, related to the power semiconductor junction temperature 101 at a stable operating temperature, heating 210 the internal gate resistance through applying an AC voltage $V_{AC}$ 11, 110, 120 of an AC source with a frequency f1 on the gate/source junction of said power semiconductor, and measuring 220 a second initial parameter, K1, related to the junction temperature 102 after said heating, and saving 230 the first and second initial parameters K0 and K1 in a memory.

This permits to obtain reference values for the initial parameters which may be temperatures or a temperature sensitive electrical parameter. This may be done several times to obtain a plurality of reference values as discussed below. After such initial phase, the method may comprise a subsequent process after at least one discrete time interval $d \in \{d1, \ldots, dn\}$ during the lifetime of the power module assembly 240:

measuring 250 a first subsequent parameter, $K0_d \in \{K0_{d1}, K0_{dn}\}$, related to the power semiconductor junction temperature at a stable operating temperature $T0_d \in \{T0_{d1}, T0_{dn}\}$ (101d1, 101dn), and heating 260 the internal gate resistance through applying the AC voltage $V_{AC}$ with a frequency f1 on the gate/source junction of said power semiconductor, and measuring 270 a second subsequent parameter, $K1_d \in \{K1_{d1}, \ldots, K1_{dn}\}$ related to the junction temperature $T1_d \in \{T1_{d1}, T1_{dn}\}$ (102d1, 102dn) after said heating.

This provides measurements of the same parameters during the life of the power semiconductor which allow to calculate a thermal resistance degradation, $\Delta R_{Th}$ with the subsequent parameters related to junction temperature $K0_d \in \{K0_{d1}, K0_{dn}\}$, and $K1_d \in \{K1_{d1}, \ldots, K1_{dn}\}$, and the initial parameters K0 and K1 as read from the memory, where $$\Delta R_{Th} = \frac{R_{Th_d}}{R_{Th}},$$

where $$R_{Th} = \frac{K1_0 - K0_0}{P_R},$$

where $$R_{Th_d} = \frac{K1_d - K0_d}{P_R},$$

where $d = d1, \ldots, dn$, and where $P_R$ is the power dissipated by the internal gate resistance under said AC voltage $V_{AC}$.

Once the calculation is done, the method may comprise a comparison of $\Delta R_{Th}$ with a limit value $\Delta R_{Th}$max and comprises raising a fault flag 310 in case $\Delta R_{Th}$ is above said limit value.

In case $\Delta R_{Th}$ remains under said limit value the method comprises repeating said subsequent process with the same d time interval or a new d time interval.

In example d may be adapted with the $\Delta R_{Th}$ value, e.g. if $\Delta R_{Th}$ is under +10%, the d interval may be increased while if $\Delta R_{Th}$ has increased, e.g. above +10%, the d interval may be reduced.

When the fault flag is raised additional tests may be provided such as tests for detecting a position of a failure in the layers between the die and heatsink through measurements with different durations h for the heating of the gate/source or gate/collector junction.

As said hereabove, the parameters $KX_y$ related to the power semiconductor junction temperature is proportional to the junction temperature $TX_y$ of said power semiconductor where X equals 0 or 1 and y is null or d when measurement is done through a temperature sensor and the parameters $KX_y$ related to the power semiconductor junction temperature is the internal gate resistance $RX_y$ of said power semiconductor where X equals 0 or 1 and y is null or d when the measurement is a TSEP method based on the internal gate resistance measurement.

In a specific embodiment, the subsequent measurements may be done at time intervals adapted to have an internal gate resistance value, $R0_d$, equal to the initial internal gate resistance, R0 within a certain range +/−k. Thus, the thermal junction resistance degradation can be estimated without any prior knowledge of the power semiconductor parameters, for any frequency f1 and with an error inferior to 5%.

For example, k is 0.1*R0.

In a further embodiment, to avoid awaiting a specific temperature to initiate the measurements, a table of initial parameters $K0_{(T)}$ representing temperatures $T0_{(T)}$ or resistances $R0_{(T)}$ and corresponding initial second parameters $K1_{(T)}$ representing temperatures $T1_{(T)}$ or resistances $R1_{(T)}$ can be built during an initial part of the life of the power semiconductor in order that when subsequent T0d or R0d and T1d or R1d measurements are done, the closest initial temperature $T0_{(T)}$ or initial resistance $R0_{(T)}$ of the table is taken to calculate the $\Delta T$ or $\Delta R$ value and compare such to the initial value to determine degradation of the thermal resistance.

As an example of this implementation, the hereunder temperature table $T0_{(T)}$, $T1_{(T)}$ is build when the usage of the power module assembly is inferior to 1000 hours and saved in a memory for several stable junction temperatures $T1 \ldots Tn$ of such power semiconductor in operation$_{(T)}$ under various loads and working temperatures.

Such a table can be represented as in the table below with temperatures.

| $T0_{(T1)}$ | $T1_{(T1)}$ |
|---|---|
| $T0_{(T2)}$ | $T1_{(T2)}$ |
| . . . | . . . |
| $T0_{(Tn)}$ | $T1_{(Tn)}$ |

With such a table the measured temperature T0d after a delay d is compared to the closest $T0_{(T)}$ as a basis for comparison of the temperature $T1_d$ after heating with the initial $T1_{(T)}$ in order to calculate the thermal resistance degradation. This simplifies the measurements when the power semiconductor is tested under various loads. In example the table may be built for temperatures between ambient to 150° C. with 10° C. steps or better. The table may be built during the initial 1000 h of operation of the power semiconductor.

Figure 9:
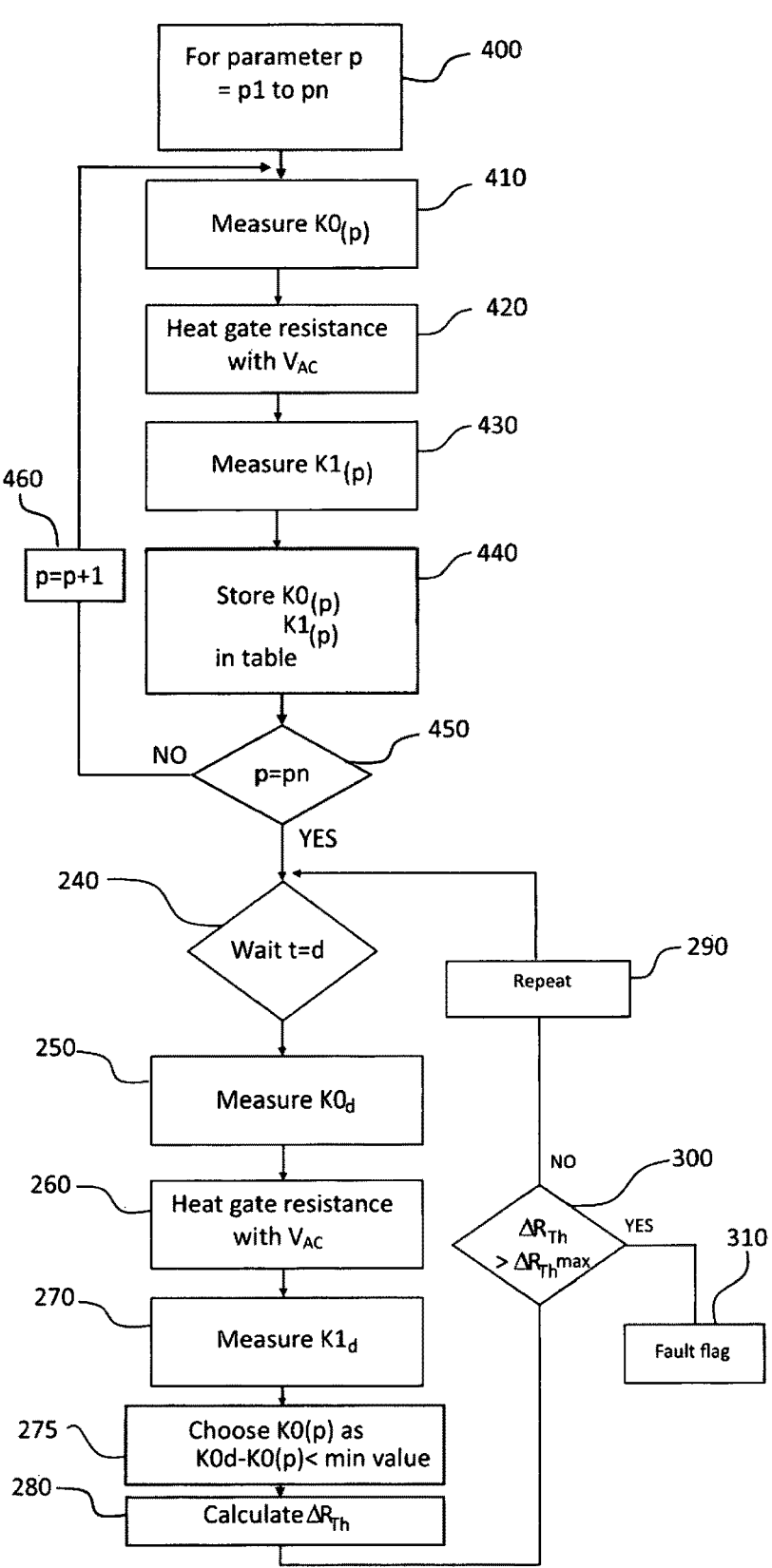
FIG. 9 is a flowchart of an embodiment of initial measurements.

Such an embodiment is depicted in FIG. 9 where the measurement temperature T is replaced by a generic parameter p the process comprises for each of the p values 400 measuring K0(p) 410, heating 420 with the voltage VAC, measuring 430 K1(p) and in 440 creating a table of the K0 and K1 values for the list of parameters p1, . . . , pn.

When the table is created, the process returns to step 240 of FIG. 8 and a step 275 of choosing a value of p giving K0(p) and K1(p) such as the difference with K0d is under a minimum value is introduced after the sequence of measuring 250, heating 260, and measuring 270, before calculating 280 $\Delta R_{Th}$.

In a similar method and to improve the capacity of detecting which layer of the power module assembly between the die of the power semiconductor and the heatsink a second table comprising several heating time durations h in reference with different time constants of layers between said power semiconductor and said heatsink and comprising initial first parameters $K0_{(T,h)}$ and second parameters $K1_{(T,h)}$ measured for said heating time durations h. In such case, the measurements after period d is done with the largest h duration of the table and when $\Delta R_{Th}$ is detected as larger than a specified value, tests with decreasing values of h are done to detect which of the layers shows the largest increase of $R_{Th}$.

With respect to the AC source, the AC voltage source preferably a DC voltage component or polarization in order that the maximum Vge or Vgs voltage values are not higher than the flat-band voltage of the power semiconductor, e.g. −3V for Vgs on FIG. 5A.

Thus, the measurements do not change the current switch state of the power semi-conductor and the gate capacitance Cin does not dependent on the bus voltage. Advantageously, the measurement may then be done while a BUS voltage is applied between the source/drain or emitter/collector of the power semiconductor device or more generally on the power converter terminals where the power semiconductor device is installed.

With respect to positioning a temperature sensor, it should be noted that the critical layers included in the semiconductor assembly seldom degrade in a non-homogeneous fashion. For example, in some cases cracks may propagate from the edge of the layer to the center of the layer, and in other cases, the layer degrades preferably at the hottest position, typically at the center of the layer under the semiconductor chip. These degradation mechanisms are related to material choices and are typically specific to a module design.

It is then preferable that the implemented temperature sensor is positioned such as the position of the initiation of the degradation is in the thermal path between the implemented temperature sensor and the heat sink to improve the sensitivity of the measurement method and detect the degradation at an early stage during the module life. Hence the propagation type of the degradation can be known upfront by laboratory testing. Upon laboratory testing the optimum position of the implemented temperature sensor is chosen such as the position of the initiation of the degradation is located in the thermal path between the implemented temperature sensor and the heat sink. For example, when the degradation of the interconnection layer under the semiconductor chip is the most critical layer to be monitored, this position may be at the edge of the semiconductor chip, when the degradation consists in cracks propagating from the position under the edge of the semiconductor to the position under the center of the semiconductor or at the center of the semiconductor chip, when the degradation starts at the hottest position. i.e. the position under the center of the semiconductor.

The invention is not limited to the examples described and in further embodiments, the position of the serial resistance in the embodiment of FIG. 7C may be changed for a serial resistance on the gate side of the power semiconductor i.e. on a border of the die or in a center part of the die, may be made out of several serial or parallel resistances located at various places on the die.

The invention claimed is:

1. A method for measuring a degradation of a thermal resistance $R_{Th}$ between a power semiconductor in a power module assembly and a heat sink of said power module assembly where said power semiconductor has an internal gate resistance, comprising:

measuring a first initial parameter, K0, related to a power semiconductor junction temperature at a stable operating temperature, heating the internal gate resistance through applying an AC voltage $V_{AC}$ of an AC source with a frequency fl on a gate/source junction of said power semiconductor, and measuring a second initial parameter, K1, related to a power semiconductor junction temperature after said heating, and saving the first and second initial parameters K0 and K1 in a memory, comprising after at least one discrete time interval d∈{d1, . . . , dn} during a lifetime of the power module assembly a subsequent process of:

measuring a first subsequent parameter, $K0_d$∈ $\{K0_{d1}, \ldots, K0_{dn}\}$, related to the power semiconductor junction temperature at a stable operating temperature $T0_d$∈$\{T0_{d1}, \ldots T0_{dn}\}$, heating the internal gate resistance through applying the AC voltage $V_{AC}$ with a frequency f1 on the gate/source junction of said power semiconductor, and measuring a second subsequent parameter, $K1_d$∈$\{K1_{d1}, \ldots, K1_{dn}\}$ related to the power semiconductor junction temperature $T1_d$∈$\{T1_{d1}, \ldots, T1_{dn}\}$ after said heating, calculating a thermal resistance degradation, $\Delta R_{Th}$ with the subsequent parameters related to power semiconductor junction temperature $K0_d$∈$\{K0_{d1}, \ldots, K0_{dn}\}$, and $K1_d$∈$\{K1_{d1}, \ldots, K1_{dn}\}$, and the initial parameters K0 and K1 as read from the memory, where $$\Delta R_{Th} = \frac{R_{Th_d}}{R_{Th}},$$

where $$R_{Th} = \frac{K1_0 - K0_0}{P_R},$$

where $$R_{Th_d} = \frac{K1_d - K0_d}{P_R},$$

where d=d1, . . . , dn and where $P_R$ is the power dissipated by the internal gate resistance under said AC voltage $V_{AC}$, comparing $\Delta R_{Th}$ with a limit value $\Delta R_{Th}$max, and raising a fault flag in case $\Delta R_{Th}$ is above said limit value or repeating said subsequent process in case $\Delta R_{Th}$ remains under said limit value.

2. The method according to claim 1, wherein the time interval d∈{d1, . . . , dn} between measurements of the thermal resistance is chosen such as the first parameter $K0_d$ remains within a specified range K0+/−k with respect to K0.

3. The method according to claim 1, comprising storing a table of initial first parameters $K0_{(T)}$ and second parameters $K1_{(T)}$ in a specified initial part of the power semiconductor life for several stable power semiconductor junction temperatures T1 . . . Tn of such power semiconductor in operation and wherein an initial value $K0_{(T)}$ and $K1_{(T)}$ is chosen within a stipulated range of the closest $K0_{d(T)}$ for a measurement at the end of an interval d.

4. The method according to claim 3, wherein the specified initial part of the power semiconductor life is before the 1000 to 1500 first hours of a semiconductor operation time.

5. The method according to claim 3, wherein said table comprise heating time durations h and wherein the first initial parameters $K0_{(T,h)}$ and second initial parameters $K1_{(T, h)}$ are measured for several of said heating time durations h in reference with different time constants of layers between said power semiconductor and said heatsink.

6. The method according to claim 1, wherein the AC voltage has a DC component to polarize the gate versus the source or emitter of the power semiconductor and has a peak voltage lower or equal to a flat band voltage of the power semiconductor.

7. The method according to claim 1, wherein the frequency f1 is lower than an inverse of the approximated gate input power semiconductor electrical time constant of the power semiconductor $(2 \cdot \pi \cdot Cin \cdot R)^{-1}$.

8. The method according to claim 1, wherein the frequency f1 is chosen as an input resonance frequency of the power semiconductor f1=$(2 \cdot \pi \cdot Lin \cdot Cin)^{-2}$.

9. The method according to claim 1, wherein the frequency f1 is higher than $0,1 \cdot (2 \cdot \pi \cdot Cin \cdot R)^{-1}$.

10. The method according to claim 1, wherein a parameter KXy related to the power semiconductor junction temperature is an internal gate resistance RXy of said power semiconductor where X equals 0 or 1 and y is null or d.

11. The method according to claim 10, comprising injecting a square DC current through the internal gate resistance of said power semiconductor without applying said AC voltage to acquire information of the internal gate resistances.

12. The method according to claim 11 wherein, a first AC voltage Vac1 with a first peak to peak level is applied to acquire an R0 or R0d value and a second AC voltage $V_{AC}$ with a second peak to peak value higher than the first peak to peak value is applied to heat the gate resistance of said power semiconductor and acquire an R1 or R1d value.

13. The method according to claim 10, comprising providing a resistance with a value Rmeas in a circuit comprising a gate/emitter or gate/source of the power semiconductor and the AC source, injecting said AC voltage $V_{AC}$ as pulses between 5V to 40V to heat the internal gate resistance, measuring a first voltage Vmeas at said resistance extremities as a first parameter Kv0 in a first peak level of the AC source and calculating a R0 value as $$R0 = Rmeas \cdot \left( \frac{V_{AC}}{Kv0} - 1 \right),$$

measuring a second voltage Vmeas at said resistance extremities as a second parameter Kv1 in a last peak level of the AC source and calculating a R1 value as $$R1 = Rmeas \cdot \left( \frac{V_{AC}}{Kv1} - 1 \right),$$

repeating said measuring and calculating to obtain R0d and R1d values.

14. The method according to claim 1, wherein a parameter KXy related to the power semiconductor junction temperature is a power semiconductor junction temperature TXy of said power semiconductor where X equals 0 or 1 an y is null or d.

15. The method according to claim 1, wherein the voltage $V_{AC}$ is issued from a control signal of a power component modulated with a heating signal.

16. A control device for a power semiconductor, comprising circuitry for generating and injecting an AC voltage $V_{AC}$ with a frequency f1 higher than a frequency enabling commutation of said power semiconductor on a gate/source junction or gate/emitter junction of said power semiconductor, for measuring a temperature or a thermal sensitive parameter of said semiconductor at selected instants of a lifetime of the power semiconductor and for calculating a resulting thermal resistance variation $\Delta R_{Th}$ along a life of said semiconductor through the method of claim 1.

17. The control device for a power semiconductor according to claim 16, wherein said thermal sensitive parameter being an internal gate resistance of said power semiconductor, said control device comprises a voltage sensor in a source branch of said AC voltage $V_{AC}$ injecting circuit.

* * * * *